United States Patent
Ledieu et al.

(10) Patent No.: US 12,283,192 B2
(45) Date of Patent: Apr. 22, 2025

(54) DETECTION METHOD OF DECOYING OF A TRAFFIC ALERT AND COLLISION AVOIDANCE SYSTEM, AND ASSOCIATED TRAFFIC ALERT AND COLLISION AVOIDANCE SYSTEM

(71) Applicant: THALES, Courbevoie (FR)

(72) Inventors: Kevyn Ledieu, Merignac (FR); Denis Ricaud, Merignac (FR); Nathalie Véronique Feyt, Merignac (FR)

(73) Assignee: THALES, Courbevoie (FR)

( * ) Notice: Subject to any disclaimer, the term of this patent is extended or adjusted under 35 U.S.C. 154(b) by 199 days.

(21) Appl. No.: 18/084,228

(22) Filed: Dec. 19, 2022

(65) Prior Publication Data

US 2023/0196927 A1 Jun. 22, 2023

(30) Foreign Application Priority Data

Dec. 20, 2021 (FR) .................... 21 13974

(51) Int. Cl.
G08G 5/00 (2006.01)
G08G 5/04 (2006.01)
G01S 13/933 (2020.01)

(52) U.S. Cl.
CPC .......... G08G 5/0078 (2013.01); G08G 5/0008 (2013.01); G08G 5/04 (2013.01); *G01S 13/933* (2020.01)

(58) Field of Classification Search
CPC ...... G08G 5/0078; G08G 5/0008; G08G 5/04; G01S 13/933; H04K 2203/22; H04K 3/255; H04K 3/22; H04K 3/65
See application file for complete search history.

(56) References Cited

U.S. PATENT DOCUMENTS

| | | | |
|---|---|---|---|
| 9,869,745 B1 * | 1/2018 | Rowlan | .................... G01S 13/74 |
| 10,880,070 B1 | 12/2020 | Delaney et al. | |
| 2003/0137444 A1 | 7/2003 | Stone et al. | |

(Continued)

FOREIGN PATENT DOCUMENTS

| | | |
|---|---|---|
| EP | 3 113 445 | 1/2017 |
| EP | 3 379 295 | 9/2018 |

OTHER PUBLICATIONS

D.J. Bernays, et al., "Validation Techniques for ADS-B Surveillance Data", Proceedings. The 21st Digital Avionics Systems Conference; [Digital Avionics Systems Conference], IEEE Operations Center, vol. 1, Oct. 27, 2002, pp. 3.E.2-1-3.E.2-9 (9 pages).

(Continued)

*Primary Examiner* — Justin Holmes
(74) *Attorney, Agent, or Firm* — NIXON & VANDERHYE (57) ABSTRACT

Disclosed is a method of detecting spoofing of a traffic alert and collision avoidance system, known as a TCAS, the TCAS having a Mode A, a Mode C and a Mode S for communicating with surrounding aircraft. The method includes: querying a suspected spoofing aircraft via Mode S of the TCAS and receiving a response to this query; deducing from the response at least some data, known as Mode S data, relating to the suspected spoofing aircraft; and validating Mode S data by querying the suspected spoofing aircraft via Mode A or Mode C of the TCAS.

11 Claims, 7 Drawing Sheets

(56) References Cited

U.S. PATENT DOCUMENTS

2005/0156777 A1\* 7/2005 King .................... G08G 5/0021
    342/29
2006/0267829 A1\* 11/2006 Brandao .............. G08G 5/0052
    342/147
2020/0391883 A1\* 12/2020 Lee ........................ B60R 25/33

OTHER PUBLICATIONS

"Notice of Proposed Amendment (NPA) 2012-19", Notice of Proposed Amendment (NPA) 2012-19, Nov. 16, 2012, 128 pages, http://easa.europa.eu/system/files/dfu/NPA_2012-19.pdf.
Wes Stamper, "Understanding Mode S Technology", Defense Electronics, vol. 76, No. 3, Dec. 2005, pp. 18-21 (4 pages).
Search Report for FR Application No. 2113974 dated Aug. 2, 2022, 3 pages.

\* cited by examiner

DETECTION METHOD OF DECOYING OF A TRAFFIC ALERT AND COLLISION AVOIDANCE SYSTEM, AND ASSOCIATED TRAFFIC ALERT AND COLLISION AVOIDANCE SYSTEM

CROSS-REFERENCE TO RELATED APPLICATIONS

This application claims priority to FR Patent Application No. 21 13974 filed Dec. 20, 2021, the entire contents of which are hereby incorporated by reference.

FIELD OF THE INVENTION

The present invention relates to a method for spoofing detection of a traffic alert and collision avoidance system.

The present invention also relates to a traffic alert and collision avoidance system associated with such a method.

The invention is in the field of air traffic management and more specifically in the management of air-air collision risks.

BACKGROUND OF THE INVENTION

As is well known, this risk is primarily managed by air traffic control. If this is not enough, the traffic alert and collision avoidance system (TCAS), which is on board all commercial aircraft, acts as a final safety net.

In particular, such a TCAS, embedded in an aircraft, is adapted to query the surrounding traffic in order to obtain the various information necessary for its operation (relative distance, bearing (angle) and relative altitude between the aircraft). To do this, the TCAS queries the surrounding transponders using Mode A/C and Mode S. This allows it to cover the different types of transponders that exist.

The relative distance is calculated by the round-trip time of the query-response with a waiting time before response that varies according to the chosen communication mode. The bearing is obtained by means of a directional antenna used for receiving the response. The altitude is provided directly in the answer.

When a potential risk of collision arises, the TCAS will first generate a Traffic Alert (TA) to warn the pilot of the potential risk. Then, if the risk is still present and confirmed, it will generate a Resolution Advisory (RA) order which consists of asking the pilot to climb, descend, and/or stop a descent or climb. If both aircraft are equipped with TCAS, their manoeuvres will be coordinated.

The TCAS has been designed and developed solely in terms of safety, but not in terms of security. The main risk of intrusion and spoofing is through radio frequency exchanges.

For example, it is possible for an attacker to simulate the responses of a transponder using a software radio. The TCAS will interpret these responses as an aircraft of the surrounding traffic which may lead to a traffic alert and even a resolution advisory. This manoeuvre then represents a danger for the surrounding traffic and the aircraft itself.

Currently, there is no solution for the detection of TCAS spoofing. However, there are physical limitations to spoofing that arise directly from the design of the TCAS. These limitations are not sufficient, however, as there is still room for manoeuvre below them.

Among the documents in the prior art, we know EP 3379295 B1 which proposes to detect false ADS-B (Automatic Dependent Surveillance—Broadcast) signals according to the angle of arrival of these signals. If a false signal is detected, the system will broadcast in a monitoring message that the information is inconsistent. However, ADS-B signals are used by the system only for distant surveillance and are not involved in the construction of traffic alerts and resolution advisories.

EP 3113445 A1 proposes to gather several potential sources of attack detection and also to compare this to different models. However, this problem does not explicitly address the TCAS spoofing problem.

U.S. Ser. No. 10/880,070 B1 proposes to use a blockchain to validate the various exchanges between aircraft, satellites and ground stations. However, this solution involves the various disadvantages of the blockchain on board the aircraft (constantly growing size of the blockchain, performance to validate new blocks, etc.).

SUMMARY OF THE INVENTION

The purpose of the present invention is to provide a solution for detecting TCAS spoofing on board the aircraft carrying the TCAS. This solution is simple and inexpensive to implement.

To this end, the invention relates to a method of detecting spoofing of a traffic alert and collision avoidance system, known as TCAS.

The TCAS has a Mode A, a Mode C and a Mode S for communicating with surrounding aircraft.

The method comprises the following steps:
querying a suspected spoofing aircraft via Mode S of the TCAS and receiving a response to this query;
deducing from said response at least some data, known as Mode S data, relating to the suspected spoofing aircraft;
validating Mode S data by querying the suspected spoofing aircraft via Mode A or Mode C of the TCAS.

In other beneficial aspects of the invention, the method comprises one or more of the following features, taken in isolation or in any technically possible combination:
the validation step is repeated N times, the suspected spoofing aircraft being recognised as false traffic when the Mode S data is not validated by any iteration;
N is greater than or equal to 3;
at least one iteration of the validation step is implemented when the suspected spoofing aircraft becomes a threat in both altitude and distance;
at least one iteration of the validation step is implemented prior to the triggering of a traffic alert in relation to the suspected spoofing aircraft;
at least one iteration of the validation step is implemented prior to the triggering of a resolution advisory in relation to the suspected spoofing aircraft;
the method further comprises a step of retrieving a transponder code from the suspected spoofing aircraft via Mode S;
the step of retrieving the transponder code is implemented:
in passive mode when the suspected spoofing aircraft is not a threat in altitude or distance;
in querying mode when the suspected spoofing aircraft is a threat in altitude or distance;
said Mode S data validation step comprises:
querying via Mode A;
identifying a response to this querying of the suspected spoofing aircraft by comparing the received transponder code with that retrieved in the retrieval step;

designating Mode S data as validated when the response from the suspected spoofing aircraft has been received within a time window determined by that Mode S data;

preferably the Mode S data comprises a relative distance to the suspected spoofing aircraft;

said Mode S data validation step comprises:

querying via Mode C;

designating Mode S data as validated when there is a response to this query with carried/deducible data corresponding to Mode S data;

preferably the Mode S data comprise a relative distance, bearing and altitude of the suspected spoofing aircraft, the method further comprises a behavioural analysis step of analysing the behaviour of the suspected spoofing aircraft in terms of the physical capabilities of an aircraft and/or a regulation;

the behavioural analysis comprises the analysis of at least one of the following:

speed of the suspected spoofing aircraft;

variation in the speed of the suspected spoofing aircraft;

detection of a fixed transmitter.

the method comprises a step of displaying in the TCAS a symbol representative of the suspected spoofing aircraft in the event of non-validation of Mode S data, said symbol being different from a symbol representative of any other aircraft whose Mode S data has been validated.

The present invention also relates to a traffic alert and collision avoidance system, known as a TCAS, comprising technical means configured to implement the spoofing detection method as previously described.

BRIEF DESCRIPTION OF THE DRAWINGS

These characteristics and advantages of the invention will become apparent upon reading the following description, given only as a nonlimiting example, referring to the attached drawings, in which.

DETAILED DESCRIPTION OF THE INVENTION

Figure 1:
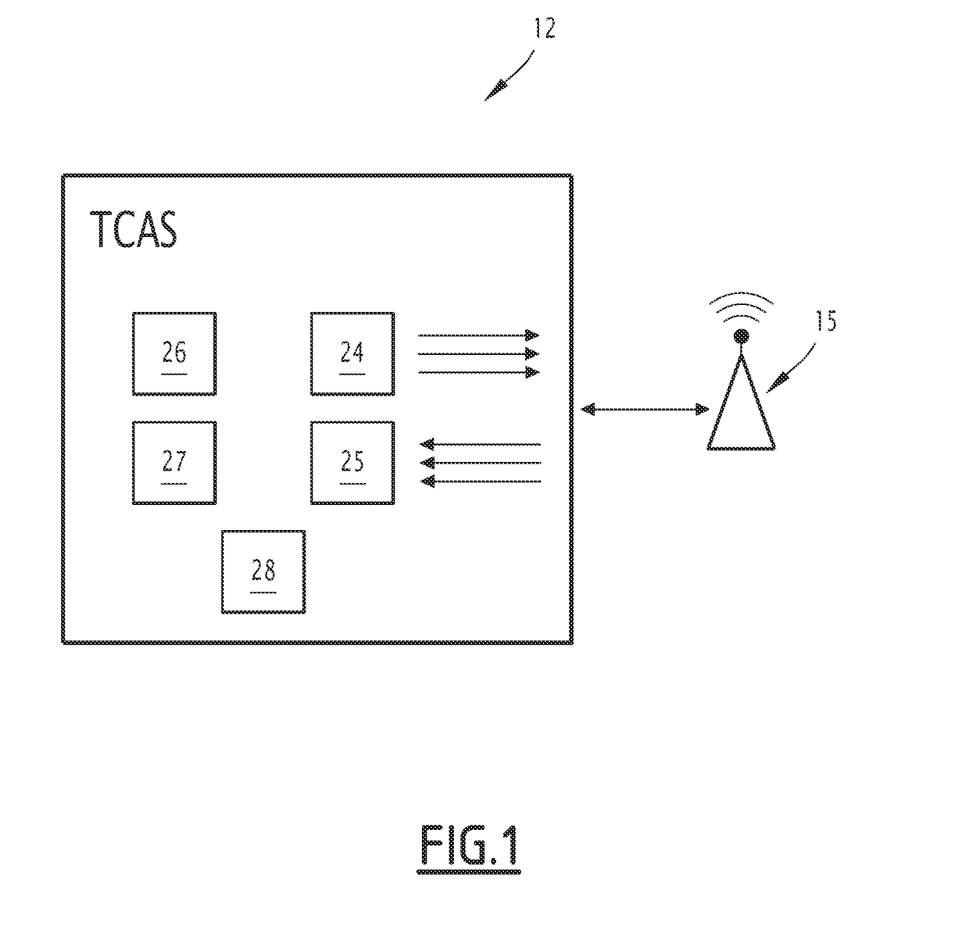
FIG. 1 is a schematic view of a traffic alert and collision avoidance system according to the invention.

A traffic alert and collision avoidance system 12, referred to as TCAS 12, according to the invention is illustrated in FIG. 1.

The TCAS 12 is carried in an aircraft. Aircraft means any machine that can be flown from within the aircraft or from a distance. In the first case, such an aircraft can be flown by a pilot and can be represented by an aeroplane, in particular a passenger plane, a cargo plane or a military plane, or a helicopter. In the second case, such an aircraft is controllable by a remote operator and can be represented by a drone.

In a manner known per se, the TCAS 12 is able to avoid collisions with surrounding aircraft within a predetermined length radius of the aircraft carrying the TCAS 12. This predetermined length is for example less than or equal to 15 NM, advantageously less than or equal to 10 NM. Among the surrounding aircraft, an aircraft that poses a threat of collision is called an intruder aircraft.

The TCAS 12 is connected to an antenna 15 capable of transmitting and receiving radio signals carrying Mode S and Mode A/C data, as will be explained later. This antenna 15 is also carried on board the aircraft.

In order to communicate with surrounding aircraft via the antenna 15, the TCAS 12 comprises a query module 24 and a reception module 25 which respectively query these aircraft and receive responses from them using Mode S data and Mode A/C data.

In particular, to communicate with surrounding aircraft using Mode A/C, the query module 24 is adapted to send queries according to a per se known Mode A or Mode C to these aircraft via the antenna 15.

Likewise, to communicate with surrounding aircraft using Mode S, the query module 24 is adapted to send queries according to a per se known Mode S to these aircraft via the antenna 15.

The reception module 25 is able to receive, via the antenna 15, responses to all the queries sent by the query module 24 and to deduce data relating to the aircraft that responded to the given querying.

In particular, when implementing a Mode A communication, the query module 24 can send Mode-A Only All-Call type queries to the Mode-A transponders of the surrounding aircraft and the reception module 25 can receive messages containing the transponder codes from these Mode-A transponders in response. Each transponder code then has an identifier of the transponder that responded to the query. In addition, each Mode A transponder has a fixed time to respond to the query. This time is approximately equal to 3 microseconds.

Thus, by knowing this response delay as well as the direction of origin of the response signals (thanks to a directional antenna for example) Mode A, the reception module 25 is able to determine a relative distance with each surrounding aircraft as well as a bearing of this aircraft.

Likewise, when implementing a Mode C communication, the query module 24 can send Mode-C Only All-Call type queries to the Mode C transponders of the surrounding aircraft and the reception module 25 can receive messages containing the altitudes from these Mode C transponders in response. As in Mode A, each Mode C transponder has a fixed time to respond to the query. This time is approximately equal to 3 microseconds.

Knowing this response time and the direction of origin of the Mode C response signals, the reception module 25 is able to determine a relative distance to each surrounding aircraft and its bearing. In addition, as noted above, the altitude of each aircraft that responded to the query is contained in the Mode C message transmitted for the corresponding Mode C transponder.

By implementing Mode S communication, the query module 24 is able to send more complex queries to the Mode S transponders of the surrounding aircraft and the reception module 25 is therefore able to receive more information about each surrounding aircraft.

Thus, for example, when the query module 24 sends the "Short Air-Air Surveillance" querying, the reception module 25 receives from each surrounding aircraft a message containing:

an ICAO (from "International Civil Aviation Organization") address of the surrounding aircraft;
its vertical status;
its cross-link capability;
its sensitivity level;
its altitude;
reply information.

The query module 24 is further adapted to send Mode-S Only All-Call and Long Air-Air Surveillance queries and the reception module 25 is adapted to receive and process responses to these queries.

As with the A/C transponder cases, each Mode S transponder has a fixed time to respond to each query. This time is approximately equal to 128 microseconds.

Again as in previous cases, knowing this response time and the direction of origin of the Mode S response signals, the reception module 25 is able to determine a relative distance to each surrounding aircraft and its bearing.

A potential attacker could misrepresent the position of an aircraft relative to the aircraft carrying the TCAS 12, by responding to Mode S queries from the TCAS 12 with a response time other than that mentioned above. In particular, an attacker could respond to such a query after a shorter time interval, which would result in the relative distance being determined shorter than in reality.

The TCAS 12 according to the invention allows to prevent such a case and in particular to detect spoofing coming from an aircraft or any other radio station which aims at distorting the relative distance to this aircraft or this station. When such spoofing is detected, the intruder aircraft with the misrepresented position is then considered false traffic.

To do so, the TCAS 12 further comprises a behavioural analysis module 26 and a validation module 27.

The behavioural analysis module 26 is configured to determine a spoofing by analysing the speed and/or successive positions of a suspected spoofing aircraft. This data relating to the suspected spoofing aircraft can be retrieved, for example, using the queries typically sent by the TCAS 12.

The validation module 27 allows spoofing to be detected by validating or not validating at least some of the data derived from the responses received via Mode S by querying the suspected spoofing aircraft via Mode A or Mode C.

In addition, to ensure validation by the validation module 27, the query module 24 and the reception module 25 of the TCAS according to the invention allow specific queries to be sent and responses to be received via modes A, C or S. These queries are unprogrammed in current TCAS systems and are sent in accordance with the detection process described in detail below.

In particular, when the detection method is implemented according to a first embodiment that makes it possible to validate an intruder aircraft via Mode A, the query module 24 additionally makes it possible to send a "Mode-A All-Call" type querying via Mode A. The reception module 25 makes it possible to receive a response to this type of query which comprises a transponder code of the transponder that responded to this query and which also makes it possible to determine a relative distance with respect to the corresponding aircraft and its bearing.

In the same embodiment, the query module 24 can additionally send a query of the type "Surveillance, Identity Request" and/or "Comme-A, Identity Request" via Mode S. The reception module 25 can receive a response to this type of query which includes a corresponding transponder code.

When the detection method is implemented according to a second embodiment that makes it possible to validate an intruder aircraft via Mode C, the query module 24 additionally makes it possible to send a "Mode-C All-Call" type querying via Mode C. The reception module 25 makes it possible to receive a response to this type of query which comprises an altitude of the corresponding aircraft which also makes it possible to determine a relative distance with respect to that aircraft and its bearing.

Finally, the TCAS 12 according to the invention further comprises a display module 28 which makes it possible to display or indicate in any other way to the pilot or the operator a result of the detection method according to the invention.

The modules 24 to 28 correspond, for example, to different computer modules programmed within the TCAS 12. According to another embodiment, at least some of these modules at least partially have a programmable logic circuit, for example of the FPGA (Field Programmable Gate Array) type.

Figure 2:
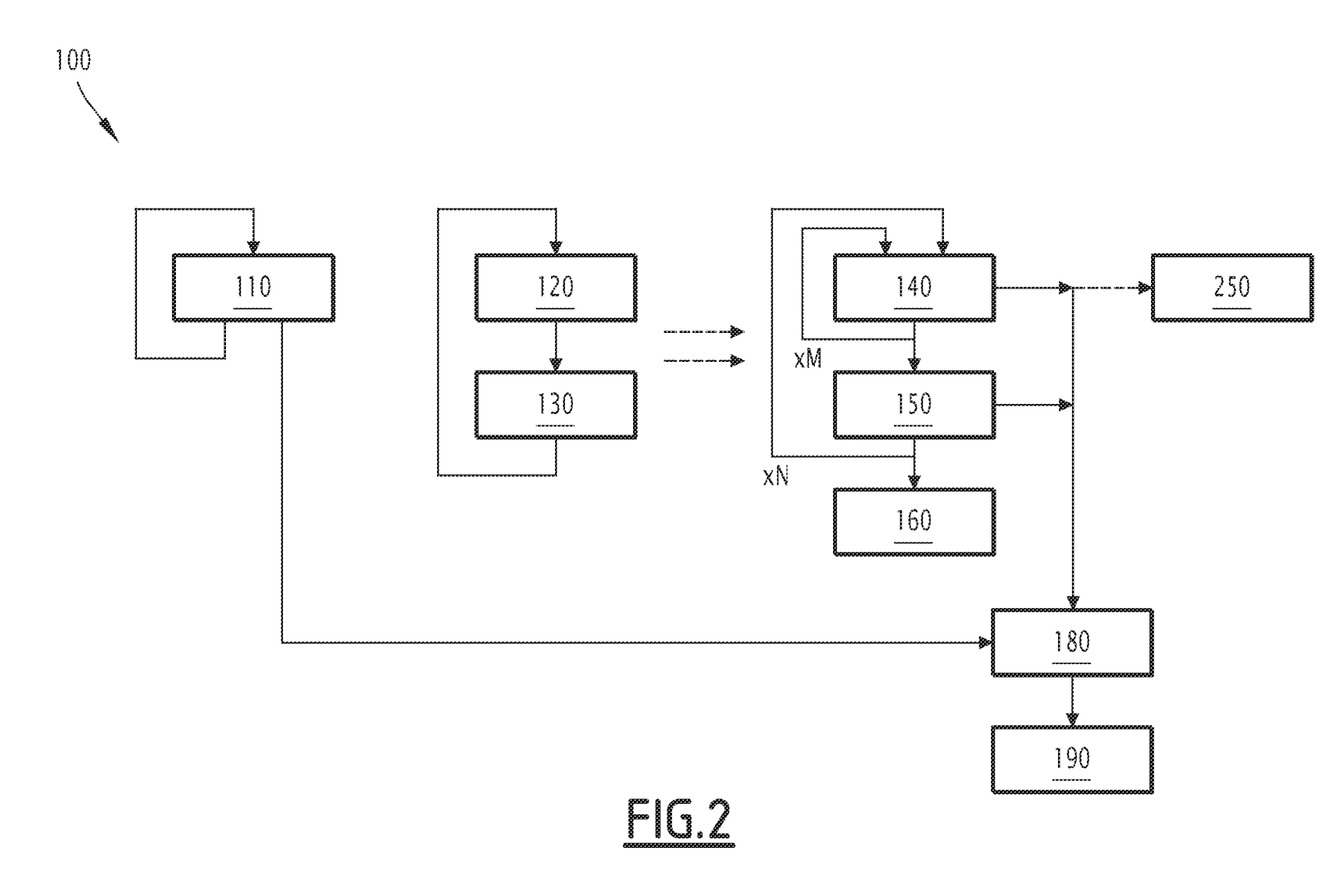
FIG. 2 is a flowchart of a detection method according to a first embodiment of the invention, the method being implemented by the system of FIG. 1.

The detection method 100 according to the first embodiment will now be explained with reference to FIG. 2, which shows a flowchart of its steps.

In particular, with reference to this figure, the detection method 100 comprises a behavioural analysis step 110 of analysing the behaviour of a suspected spoofing aircraft to detect a spoofing or otherwise validate an intruder aircraft.

This step 110 is implemented by the behavioural analysis module 26 independently of steps 120 to 160 of the method 100. It can for example be implemented in parallel with these steps 120 to 160, before these steps or after these steps.

In some cases, the result of the analysis performed in this step 110 may condition the implementation of steps 120 to 160, or the result of the implementation of steps 120 to 160 may condition the implementation of this step 110.

In some other cases, this step 110 is carried out in parallel with steps 120 to 160 of the method 100 and the results of these implementations are then compared to make a final decision, for example in step 180 explained in more detail below.

In step 110, the behavioural analysis module 26 analyses the behaviour of the suspected spoofing aircraft with respect to the physical capabilities of an aircraft and/or a regulation, for example a current regulation.

In particular, the behavioural analysis comprises the analysis of at least one of the following:
speed of the suspected spoofing aircraft;
variation in the speed of the suspected spoofing aircraft;
detection of a fixed transmitter.

When the behavioural analysis is based on the speed of the suspected spoofing aircraft, spoofing can be detected when the aircraft does not comply with the speed limits imposed by the regulations or has a speed outside its operational capabilities.

For example, aviation regulations limit speed to 250 knots below flight level FL100. It should be noted that it is forbidden to fly over land above the speed of sound.

|  | Below FL100 | Above FL100 |
| --- | --- | --- |
| Overland | 250 knots maximum | Sound speed which will be defined according to the actual conditions (altitude, atmospheric pressure, temperature, etc.) |
| Over seas and oceans | 250 knots maximum | No limitation |

The operational capabilities of the aircraft can be determined in the same way, for example by its type.

When the behavioural analysis is based on variations in the speed of the suspected spoofing aircraft, spoofing can be detected when these variations are outside a legitimate range of speed variations. This range of variation can for example be determined by an analysis of global traffic over a certain period. This range may be updated as air traffic develops over the years.

Spoofing can also be detected when the suspected spoofing aircraft is determined to be a fixed transmitter. To determine a fixed transmitter, the intersections of the relative distance lines between the aircraft carrying the TCAS 12 and the suspected spoofing aircraft can be analysed.

Figure 3:
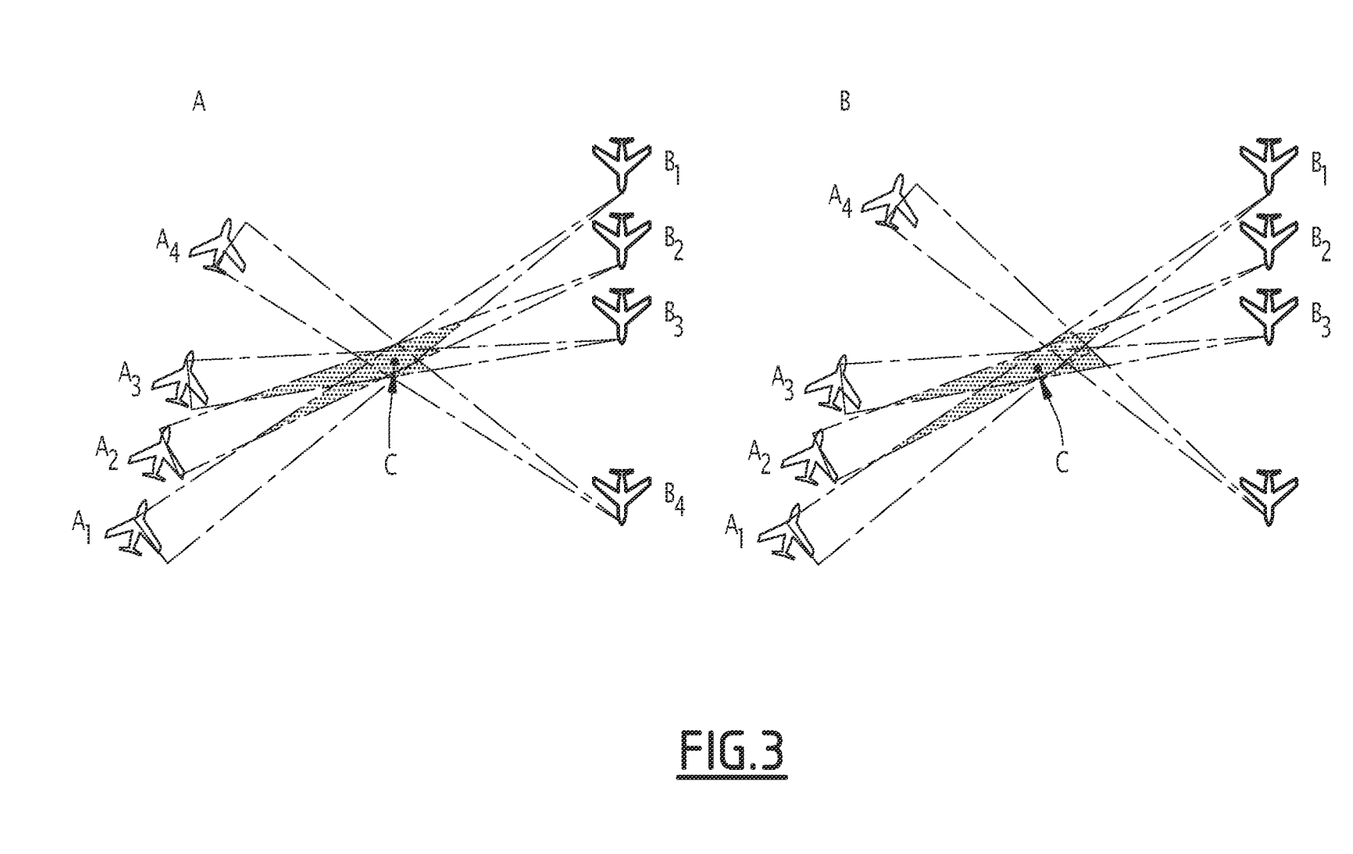
FIGS. 3 to 5 are different schematic views illustrating the implementation of the method of FIG. 2.

In particular, if a transmitter is fixed with respect to the Earth, then all lines passing through the assumed position of the suspected spoofing aircraft and the aircraft carrying the TCAS 12 will always intersect at the same point, which is the position of the transmitter.

Such a case is illustrated in part A of FIG. 3 where A1 to A4 show successive assumed positions of the suspected spoofing aircraft and B1 to B4 show actual positions of the aircraft carrying the TCAS 12. The detection cones determined by TCAS 12 all intersect around a single position C. This position C therefore has a high probability of being the position of a fixed transmitter which simulates the positions A1 to A4.

On the other hand, if a transmitter is in motion, the lines may also cross, but not always at the same point unless the transmitter is aligned in the longitudinal axis of the aircraft.

Such a case is illustrated in part B of FIG. 3 where the detection cone from position B4 of the aircraft carrying TCAS 12 deviates from point C. Thus, in such a case, positions A1 to A4 may correspond to actual positions of the suspected spoofing aircraft.

Of course, the behavioural analysis can be based on the analysis based on each of the above elements or only on some of them. Other elements can also be taken into account when conducting the behavioural analysis.

The other steps of the method 100 will now be explained. As mentioned above, these steps are carried out independently of step 110.

In addition, it is assumed that each aircraft detected for the first time by TCAS 12 is considered to be a suspected spoofing aircraft and does not initially pose a threat. The following steps of the method are carried out for each suspected spoofing aircraft.

The steps 120 and 130 described below are performed cyclically at a predetermined frequency to monitor for a possible threat from the suspected spoofing aircraft.

In step 120, the query module 24 interrogates the suspected spoofing aircraft via Mode S of the TCAS 12. The query sent to the suspected spoofing aircraft is for example "Short Air-Air Surveillance" or "Mode-S Only All-Call".

Next, the reception module 25 receives a response from the suspected spoofing aircraft to this query.

In step 130, the reception module 25 deduces from said response at least some data, called Mode S data, relating to the suspected spoofing aircraft. Advantageously, this Mode S data comprise the relative distance to the suspected spoofing aircraft, its bearing and altitude, and its ICAO address.

Based on this data, the reception module 25 also determines the type of threat, i.e. altitude and/or relative distance that the suspected spoofing aircraft may have.

The following steps 140 to 160 of the method are implemented in parallel with steps 120 and 130 and are intended to validate the Mode S data obtained in steps 120 and 130.

In step 140, the validation module 27 retrieves the transponder code of the suspected spoofing aircraft via Mode S.

To do this, when the suspected spoofing aircraft presents no threat, the validation module 27 is in a passive mode and attempts to read any "Surveillance, Identity Request" and/or "Comme-A, Identity Request" messages sent via Mode S by the suspected spoofing aircraft.

Figure 4:
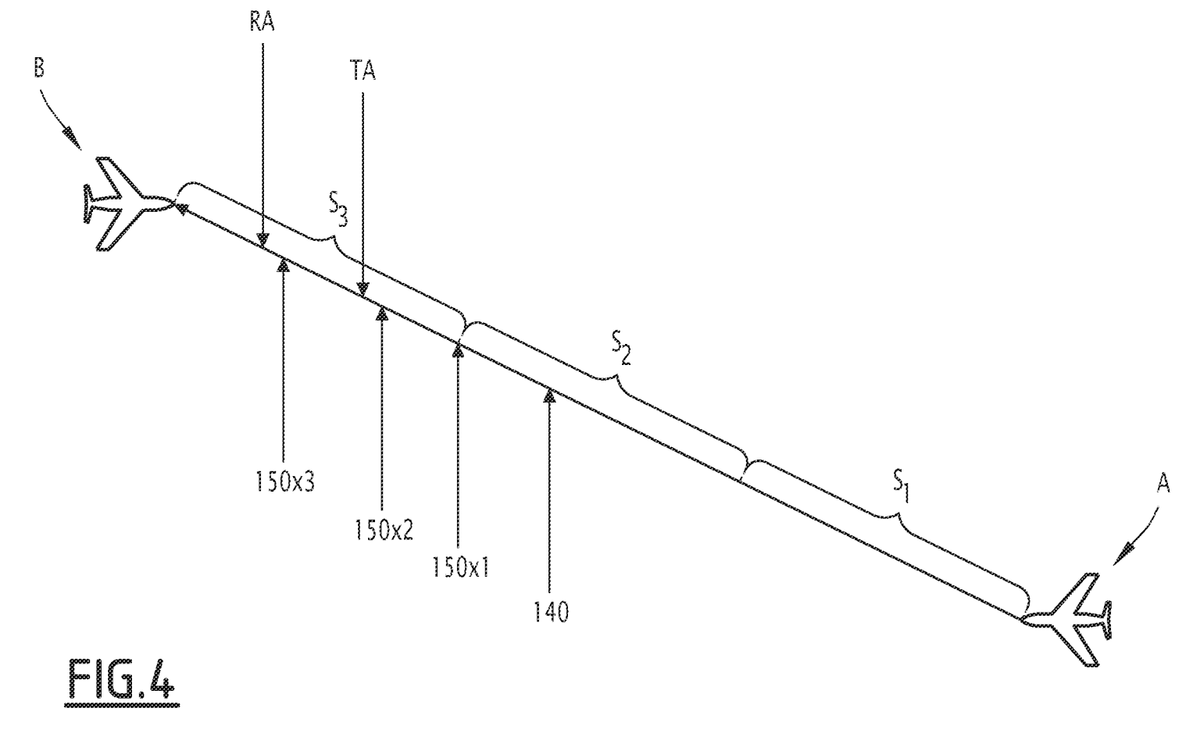

In FIG. 4, such a situation corresponds to the case when the suspected spoofing aircraft A is in segment 51 which is more than a safe distance away from the aircraft B carrying the TCAS 12. This safe distance is for example 10 NM.

If the transponder code could not be retrieved and the relative distance between the two aircraft becomes less than the safe distance and the suspected spoofing aircraft becomes a threat in altitude or relative distance, the validation module 27 switches to query mode and commands the query module 24 to send a Surveillance, Identity Request and/or Comme-A, Identity Request via Mode S.

In FIG. 4, such a situation corresponds to the case when the suspected spoofing aircraft A is in the segment S2 where it presents a threat in altitude or relative distance.

When after M attempts no response to this query from the suspected spoofing aircraft is received, the validation module 27 proceeds for example to a Mode S data validation by Mode C, as will be explained in relation to the second embodiment. In particular, in such a case, the validation module 27 may proceed to step 250 of the method 200 explained with reference to FIG. 6. Alternatively, where M attempts have been unsuccessful, spoofing may therefore be detected and this aircraft is considered to be false traffic in step 180. The number M is for example greater than or equal to 3, advantageously equal to 3.

Otherwise, the transponder code is associated with the ICAO address of the aircraft and is part of the Mode S data corresponding to that ICAO address. Additionally, step 150 is implemented.

In step 150, the validation module 27 validates or does not validate the Mode S data corresponding to the suspected spoofing aircraft by querying this aircraft via Mode A.

To do this, the validation module 27 commands the query module 24 to send a Mode-A All-Call query via Mode A. The reception module 25 receives a response to this type of query which includes a transponder code of the transponder which responded to this query.

By virtue of the transponder code retrieved in the previous step 140, the validation module 27 identifies, among all the responses received, a response to this query of the suspected spoofing aircraft. This is done by comparing the received transponder code with the one retrieved in step 140.

Next, the validation module 27 designates the Mode S data as validated when the response from the suspected spoofing aircraft has been received within a time window determined by that Mode S data and, in particular, by the relative distance to that aircraft. When the Mode S data is validated, in step 160, the suspected spoofing aircraft is considered to be real traffic and the TCAS 12 acts in its normal operating mode to avoid a collision with that aircraft.

If the Mode S data is not validated or could not be validated (e.g. due to the absence of a Mode A response) after N iterations, then the suspected spoofing aircraft is considered as false traffic in step 180. In step 180, this result can be compared with the result of step 110 to make a decision. The number N is for example greater than or equal to 3, advantageously equal to 3.

Advantageously, at least one iteration of the step 150 is implemented when the suspected spoofing aircraft becomes a threat in both altitude and distance. In the example shown in FIG. 4, such a case occurs when the suspected spoofing aircraft enters the segment S3 where it presents a threat in both altitude and distance.

At least one further iteration of step 150 is implemented prior to triggering a traffic alert TA in relation to the suspected spoofing aircraft and at least one iteration of step 150 is implemented prior to triggering a resolution advisory RA in relation to the suspected spoofing aircraft. These two cases are also illustrated in FIG. 4.

When false traffic is detected, i.e. step 180 is implemented, the method 100 also includes a step 190 of displaying in the TCAS 12 a symbol representative of the false traffic. This step 190 is implemented by the display module 27.

Advantageously, according to the invention, the symbol of the false traffic displayed by the display module 27 is different from a symbol representative of any other aircraft whose Mode S data has been validated, i.e. any other aircraft considered as real traffic.

Figure 5:
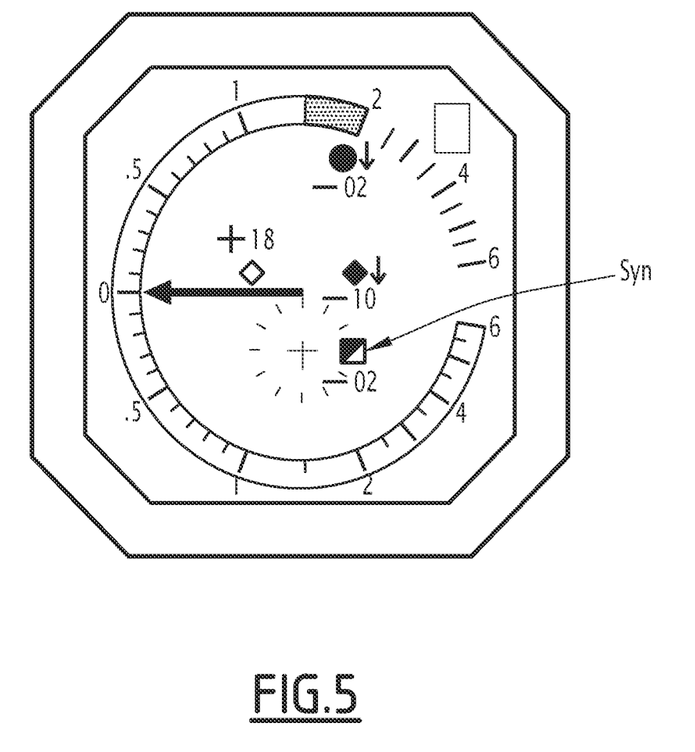

For example, with reference to FIG. 5 showing an example of the TCAS 12 display, the symbol Syn represents false traffic. This symbol has a shape normally used to represent real traffic (i.e. a square for example) but defines a characteristic (such as a colour) to signal to the pilot or operator that it is false traffic according to the validation module 27. In the example shown in FIG. 5, one-half of the square is coloured in a usual colour (e.g. red) and the other half in a different colour. In this way, the pilot or operator is warned that there is false traffic without losing sight of it.

Figure 6:
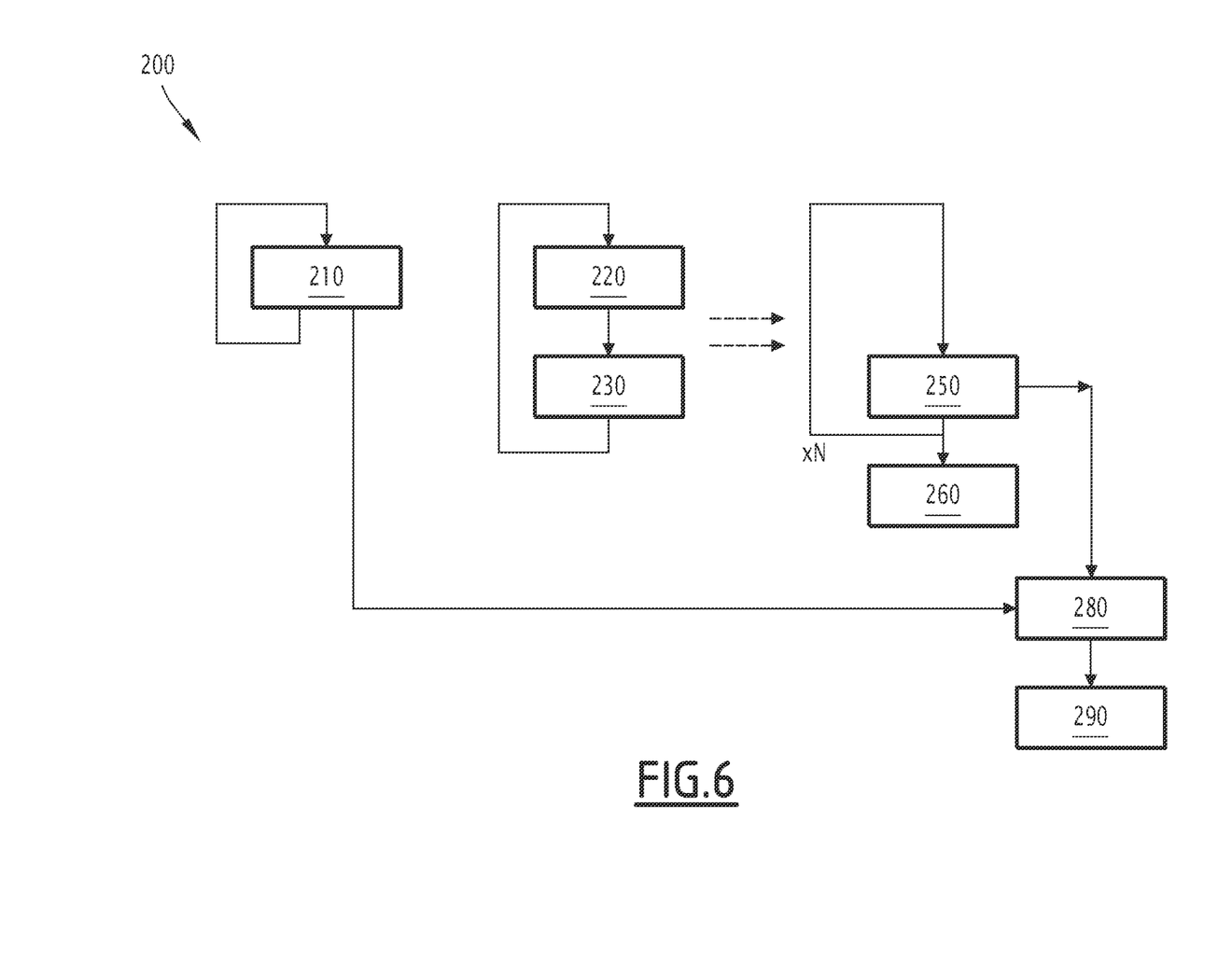
FIG. 6 is a flowchart of a detection method according to a second embodiment of the invention, the method being implemented by the system of FIG. 1.

The detection method 200 according to the second embodiment will now be explained with reference to FIG. 6, which shows a flowchart of its steps.

In particular, this method 200 comprises steps 210, 220, 230, 260, 280 and 290 which are substantially analogous to steps 110, 120, 130, 160, 180 and 190 explained above and will not be explained in relation to this second embodiment.

Unlike step 150 explained above, step 250 according to the second embodiment comprises validating the Mode S data by querying the suspected spoofing aircraft via Mode C of the TCAS 12 and not Mode A.

Furthermore, according to the second embodiment, there is no need to retrieve the transponder code so that step 140 is not implemented.

To implement step 250, the validation module 27 commands the query module 24 to send a Mode-C All-Call query via Mode C. The reception module 25 receives responses to this type of query, each of which comprises an altitude of the aircraft whose transponder has responded to this query. Next, the reception module 25 associates a relative distance and a corresponding bearing with each response received.

Subsequently, the Mode S data relating to the suspected spoofing aircraft is designated as validated by the validation module 27 when there is a response to the Mode C query which has substantially the same altitude, relative distance, and bearing as the corresponding data contained in the Mode S data.

Next, as in the previous case, when the Mode S data is validated, in step 260, the suspected spoofing aircraft is considered to be real traffic and the TCAS 12 acts in its normal operating mode to avoid a collision with that aircraft. Otherwise, step 250 is repeated N times before steps 280 and 290 are implemented.

Figure 7:
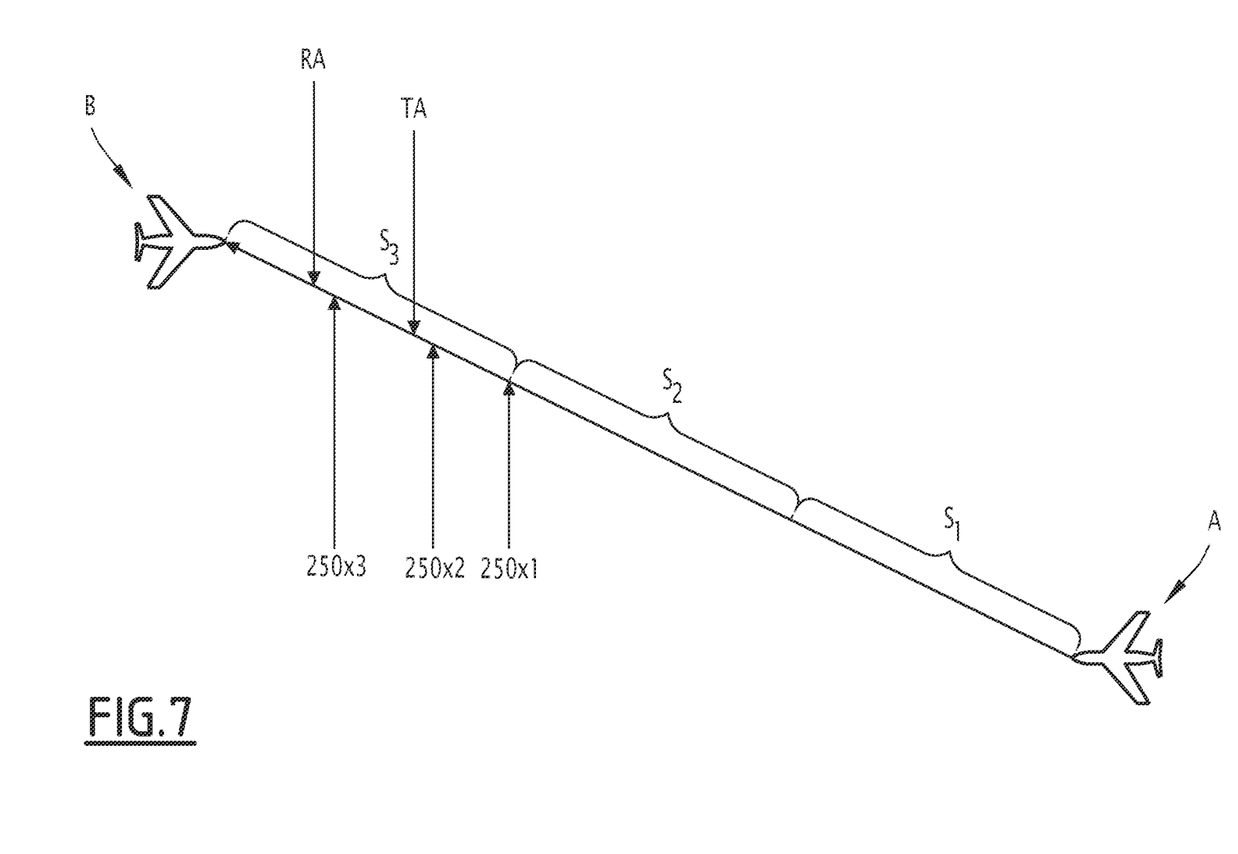
FIG. 7 is a schematic view illustrating the implementation of the method of FIG. 6.

Furthermore, as in the previous case, N can be equal to 3 and each iteration is implemented at the same times as mentioned above. This is shown in FIG. 7.

It is therefore conceivable that in both embodiments, the invention relies on the fact that the response time to queries in Modes A or C is considerably shorter than in Mode S. Thus, a response in Modes A or C is practically instantaneous and this response time cannot be shortened with a simulator of a radio transmitter. On the other hand, the response time in Mode S can be shortened by a potential attacker who can then mislead their position. By proposing to validate the Mode S data with a specific Mode A or Mode C query, the invention thus makes it possible to check whether this Mode S feature has been used or not.

The invention claimed is:

1. A method for spoofing detection of a traffic alert and collision avoidance system, called TCAS;
    the TCAS having a Mode A, a Mode C and a Mode S for communicating with surrounding aircrafts;
    the method comprising the following steps:
        querying a suspected spoofing aircraft via Mode S of the TCAS and receiving a response to this query;
        deducing from said response data, called Mode S data, relating to the suspected spoofing aircraft;
        validating the Mode S data by querying the suspected spoofing aircraft via Mode A or Mode C of the TCAS.

2. The method for spoofing detection according to claim 1, wherein the validation step is repeated N times, the suspected spoofing aircraft being recognised as false when the Mode S data traffic is not validated by any iteration.

3. The method for spoofing detection according to claim 1, wherein:
    N is greater than or equal to 3;
    at least one iteration of the validation step is implemented when the suspected spoofing aircraft becomes a threat in both altitude and distance;
    at least one iteration of the validation step is implemented prior to the triggering of a traffic alert in relation to the suspected spoofing aircraft;
    at least one iteration of the validation step is implemented prior to the triggering of a resolution advisory in relation to the suspected spoofing aircraft.

4. The method for spoofing detection according to claim 1, further comprising a step of retrieving a transponder code of the suspected spoofing aircraft via Mode S.

5. The method for spoofing detection according to claim 4, wherein the step of retrieving the transponder code is implemented:
    in passive mode when the suspected spoofing aircraft is not a threat in altitude or distance;
    in querying mode when the suspected spoofing aircraft is a threat in altitude or distance.

6. The method for spoofing detection according to claim 4, wherein said Mode S data validation step comprises:
    querying via Mode A;
    identifying a response to this querying of the suspected spoofing aircraft by comparing the received transponder code with that retrieved in the retrieval step;
    designating Mode S data as validated when the response from the suspected spoofing aircraft has been received within a time window determined by that Mode S data;
    the Mode S data comprising a relative distance to the suspected spoofing aircraft.

7. The method for spoofing detection according to claim 1, wherein said Mode S data validation step comprises:
    querying via Mode C;
    designating Mode S data as validated when there is a response to this query with carried/deducible data corresponding to Mode S data;
    the Mode S data comprising a relative distance, bearing and altitude of the suspected spoofing aircraft.

8. The method for spoofing detection according to claim 1, further comprising a behavioural analysis step consisting of analysing the behaviour of the suspected spoofing aircraft in terms of the physical capabilities of an aircraft and/or a regulation.

9. The method for spoofing detection according to claim 8, wherein the behavioural analysis comprises analysing at least one of the following:
   speed of the suspected spoofing aircraft;
   variation in the speed of the suspected spoofing aircraft;
   detection of a fixed transmitter.

10. The method for spoofing detection according to claim 1, further comprising a step of displaying in the TCAS a symbol representative of the suspected spoofing aircraft in the event of non-validation of Mode S data, said symbol being different from a symbol representative of any other aircraft whose Mode S data has been validated.

11. A traffic alert and collision avoidance system, called TCAS, comprising a query module, a reception module, a behavioural analysis module, a validation module and a display module configured to implement the method for spoofing detection according to claim 1.

* * * * *